(12) United States Patent
Matsumoto (10) Patent No.: US 10,757,172 B2
(45) Date of Patent: Aug. 25, 2020

(54) MANAGEMENT SYSTEM AND METHOD

(71) Applicant: CANON KABUSHIKI KAISHA, Tokyo (JP)

(72) Inventor: Kiyonori Matsumoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/566,763

(22) Filed: Sep. 10, 2019

(65) Prior Publication Data

US 2020/0092353 A1    Mar. 19, 2020

(30) Foreign Application Priority Data

Sep. 19, 2018    (JP) .................................. 2018-174454

(51) Int. Cl.
*G06F 15/16*    (2006.01)
*H04L 29/08*    (2006.01)
*H04L 12/933*    (2013.01)
*G06F 15/78*    (2006.01)

(52) U.S. Cl.
CPC .......... *H04L 67/10* (2013.01); *G06F 15/7821* (2013.01); *H04L 49/103* (2013.01)

(58) Field of Classification Search
CPC ... H04L 67/10; H04L 49/103; G06F 15/7821; G06F 11/1464
USPC .................................................. 709/203, 219
See application file for complete search history.

(56) References Cited

U.S. PATENT DOCUMENTS 9,118,722 B1 * 8/2015 Gershon ................. H04L 67/10
2019/0028552 A1 * 1/2019 Johnson, II ............. H04L 67/16

FOREIGN PATENT DOCUMENTS

JP    2008-077324 A    4/2008

* cited by examiner

*Primary Examiner* — Frantz B Jean
(74) *Attorney, Agent, or Firm* — Canon U.S.A., Inc. IP Division (57) ABSTRACT

A system for managing received data is provided, which, as an expiration date and time, sets time at which a notification is executed for each entity written into an expiration date and time table, deletes the entity in response to an event that is a lapse of the expiration date and time, and executes a notification to a registration destination.

7 Claims, 9 Drawing Sheets

MANAGEMENT SYSTEM AND METHOD

BACKGROUND

Field of the Disclosure

The present disclosure relates to a management system used when periodic processing for a device is not performed in an event-driven computing service in a cloud service.

Description of the Related Art

Conventionally, in a system for managing an image processing apparatus such as a multifunction peripheral (MFP), there is known a system for checking a status of backup processing of each MFP at a predetermined time (for example, 2 a.m.) every day. In such a system (backup and restore system), if there is a device in which the backup processing has failed, that device is identified, and an email indicating the failure of backup processing is transmitted to an administrator or the like.

A service provider, which provides such a backup and restore system, has a desire to provide a service to a contract customer who owns the MFP at the lowest possible price, and therefore, the service provider would like to realize an operation of the backup and restore system at low cost.

By the way, in recent years, a virtualization technology for reducing the cost of hardware has been developed by sharing and using an infrastructure such as a server among a plurality of people. In particular, a technology called serverless, in which hardware is shared in functional units to further improve server utilization efficiency, has become widespread. For example, use of a serverless system such as AWS Lambda™ can further reduce costs compared to a case where a resident service is built to achieve the virtualization technology.

Therefore, it is conceivable to provide a service by using a serverless technology also in a backup and restore system.

However, in general, the serverless technology is designed such that functions are shared, and thus, to ensure that a single function does not continuously occupies hardware resources, the function is timed out within a predetermined time period.

Japanese Patent Application Laid-Open No. 2008-77324 discusses a client-server system in which a client periodically transmits a state notification to a server. In Japanese Patent Application Laid-Open No. 2008-77324, the server notifies a user upon detection that a periodic state notification is not transmitted from the client. In the above detection, reception times of a last status are periodically obtained from all the clients, and then, determination is made as to whether each of the obtained times is a predetermined time or more before a current time.

However, in a system such as the system discussed in Japanese Patent Application Laid-Open No. 2008-77324, in view of a processing flow, if the number of clients increases, an execution time period of processing to be performed for the state notification also increases.

Further, as described above, the function is timed out in the serverless system, and thus, the function may be highly likely that time out occurs if the above system is directly applied to the serverless system. Therefore, the above system cannot be directly applied to the serverless system.

In addition, if transmission of a backup file fails, the failure cannot be detected on the device (MFP) side. In such a case, a user needs to check the transmission failure on a cloud service.

SUMMARY

A management system for receiving data from a plurality of network devices to manage the received data, including, at least one memory storing instructions, and at least one processor executing the instructions causing an information processing apparatus to: write, as an expiration date and time, into a database, time period information corresponding to time of receiving data from each of the network devices, for each of the network devices; execute a notification with respect to a network device corresponding to the expiration date and time, according to a first function to be executed in response to an event based on a lapse of the expiration date and time in the database; and subsequently write, according to the first function, as the expiration date and time for the network device for which the notification is executed, into the database, time period information corresponding to next time for receiving data from the network device, wherein the first function is ended after the expiration date and time is written.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

Figure 1:
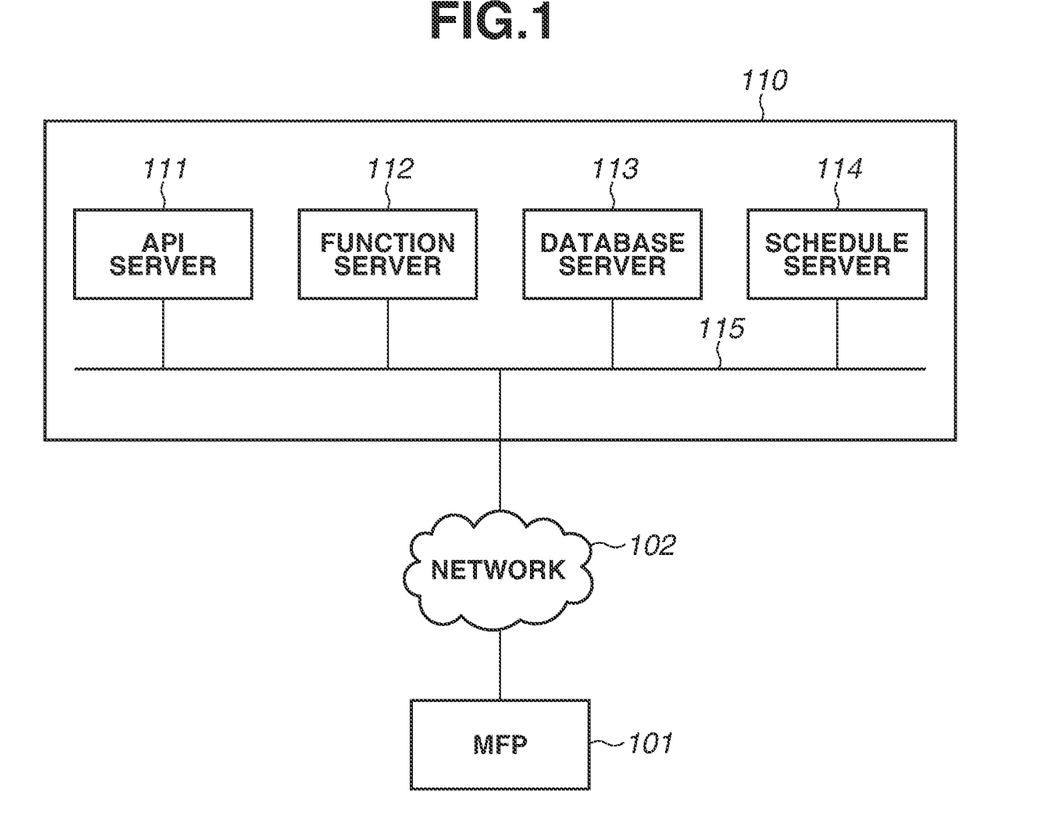
FIG. 1 illustrates an example of a configuration of an entire management system.

A first exemplary embodiment will be described below. FIG. 1 illustrates an example of a configuration of an entire management system according to the present exemplary embodiment.

The system includes a multifunction peripheral (MFP) 101, an application system 110, and a network 102.

The MFP 101 is an example of a network device managed in the system, and is connected to the application system 110 via the network 102. The MFP 101 periodically transmits data generated on the MFP 101, which is typified by, for example, backup data and print sheet count data, to the application system 110 through the network 102. Although only one MFP 101 is illustrated in FIG. 1, in the present exemplary embodiment, it is assumed that a large number of MFPs 101 are connected to the network 102. Also, the network device is not limited to the MFP, and may include various types of information and communication technology (ICT) devices.

The network 102 is a so-called communication network. The network 102 is realized by any one of a local area network (LAN) such as the Internet, a wide area network (WAN), a telephone line, a dedicated digital line, an automated teller machine (ATM) or a frame relay line, a cable television line, a wireless line for data broadcasting, and the like, or a combination thereof.

The application system 110 includes a server group comprising various servers such as an application programming interface (API) server 111, a function server 112, a database server 113, and a schedule server 114, and an internal network 115. Also, the application system 110 is, for example, a system realized by a cloud service.

The API server 111 analyzes a request from the MFP 101, and selects and executes a function for realizing the request from the function server 112. Generally, the API server 111 receives a request utilizing a protocol typified by Hypertext Transfer Protocol (HTTP), identifies a resource to be accessed from a uniform resource identifier (URI), and executes a function capable of operating the resource.

Communication that can be received by the API server 111 is not limited to communication utilizing HTTP, and may be, for example, bi-directional communication utilizing a protocol such as WebSocket or a unidirectional communication utilizing a protocol such as User Datagram Protocol (UDP). The API server 111 in the present exemplary embodiment will be specifically described as a server utilizing the HTTP protocol.

The function server 112 manages an event and a function executed when the event occurs, in an associated manner. Further, the function server 112 executes the function registered in association with an event, in response to the event as a trigger, which is generated in each of the servers connected through the internal network 115.

Further, the function server 112 releases a resource utilized by the function after the execution of the registered function is completed. This makes it possible to execute various types of functions on the same server, which reduces an amount of hardware resources required. Further, the function server 112 has a time-out setting of ending the function when an execution time period of the registered function is equal to or more than a constant time period (time-out period).

The database server 113 saves data periodically transmitted from the MFP 101 (periodically transmitted data) after assigning an index to the data to improve searchability. Moreover, the database server 113 is utilized to save an expiration date and time table described below. Further, every time processing for writing or deleting data into or from a database is performed, the database server 113 notifies the function server 112 of the processing, as an event.

Also, the database server 113 can set an expiration date and time (may be also referred to as "Time to Live") for automatically deleting an entity for each item (entity) to be saved in the database. Upon detection of a lapse of the expiration date and time of the entity, the database server 113 deletes the entity from the database.

The schedule server 114 includes a timer, and notifies the function server 112 of an event upon detection of arrival of a designated time.

The internal network 115 is a so-called communication network configured to connect the servers in the application system 110. The internal network 115 is realized by any one of a virtual private network (VPN) configured on an LAN such as the Internet, a WAN, a telephone line, a dedicated digital line, an ATM or a frame relay line, a cable television line, a wireless line for data broadcasting, or the like, or a combination thereof.

Figure 2A:
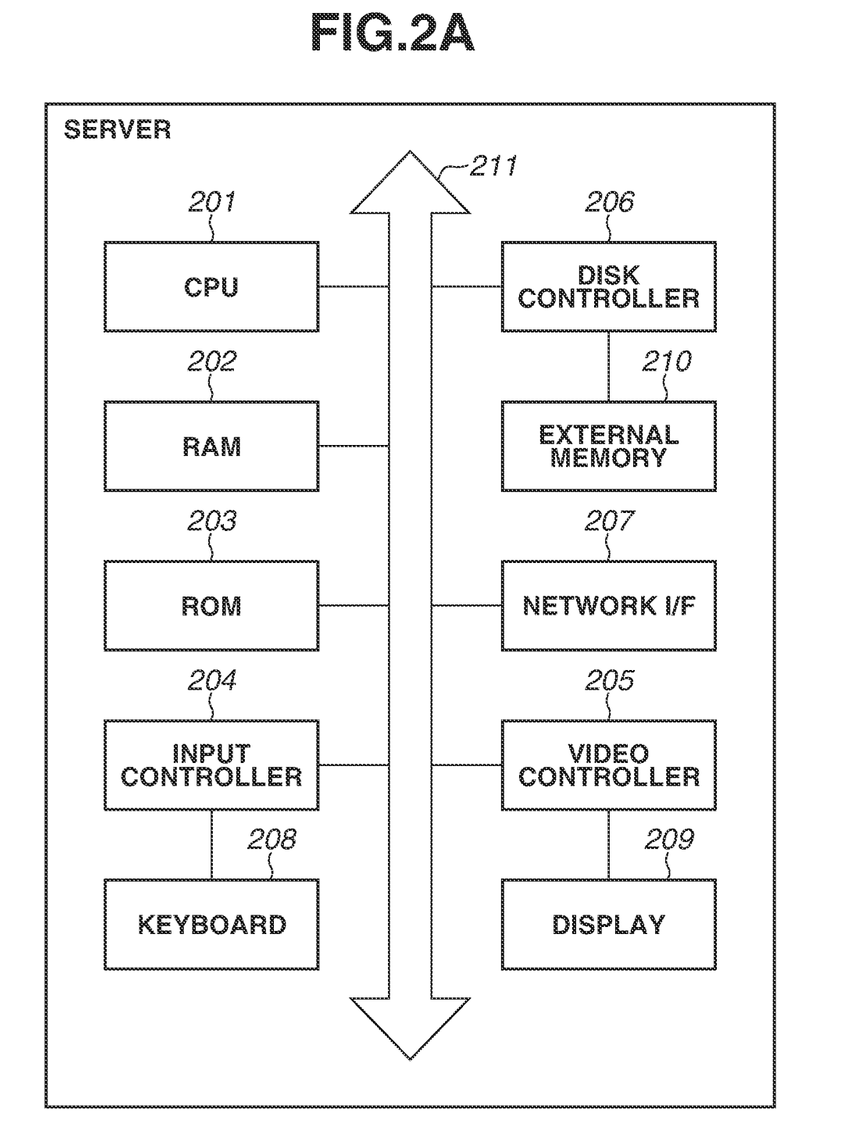
FIG. 2A illustrates an example of a hardware configuration of each server.
Figure 2B:
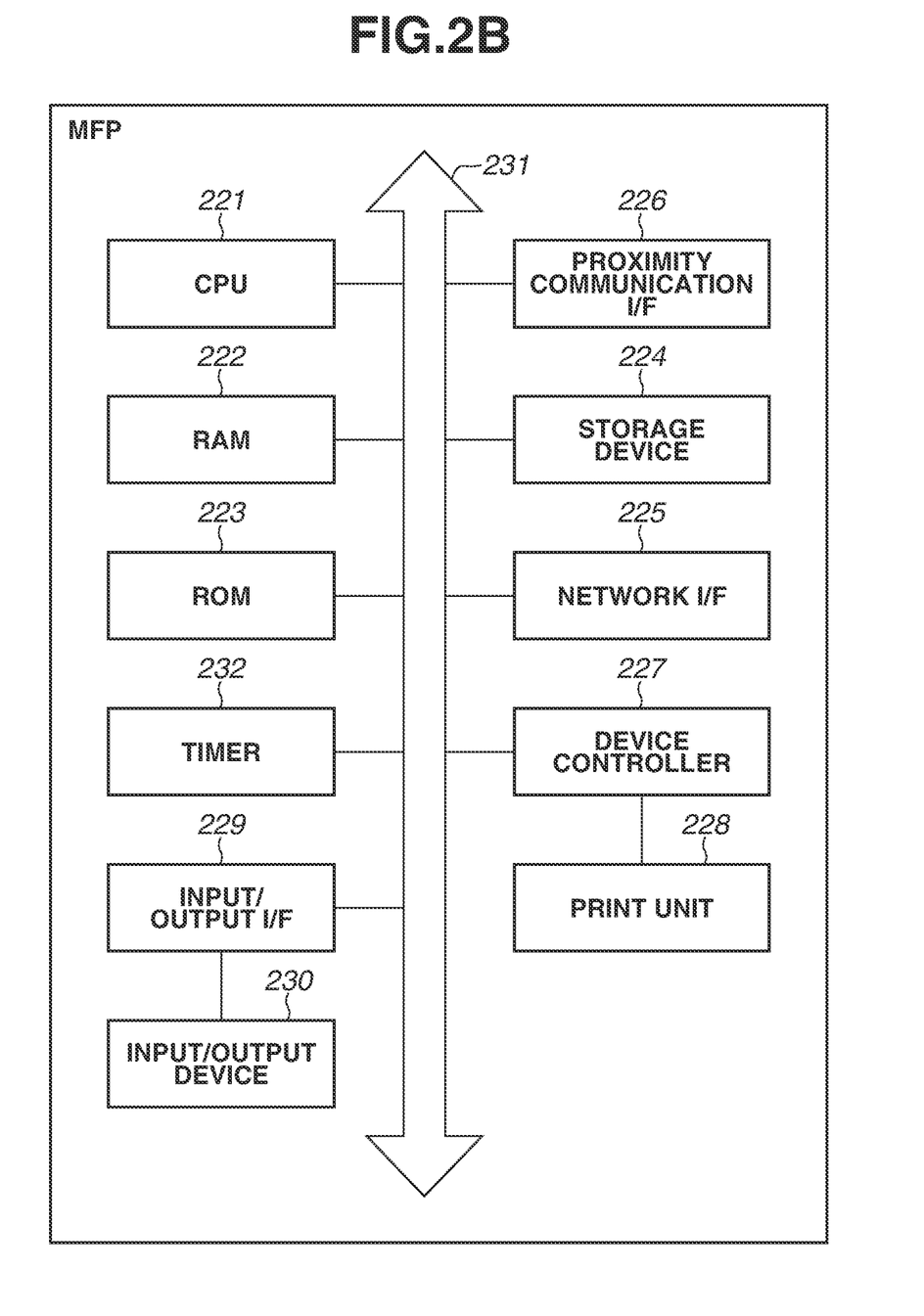
FIG. 2B illustrates an example of a hardware configuration of a multifunction peripheral (MFP).

FIGS. 2A and 2B are diagrams illustrating each example of a configuration of hardware of each of the devices such as the servers and the MFP used in the system.

FIG. 2A illustrates a hardware configuration in an information processing apparatus included in the server such as the API server 111, the function server 112, the database server 113, and the schedule server 114. The configuration can include hardware of a general information processing apparatus (so-called a personal computer (PC)).

A central processing unit (CPU) 201 executes a program stored in a read only memory (ROM) 203 and a program such as an operating system (OS) and an application loaded from an external memory 210 into a random access memory (RAM) 202. That is, the CPU 201 executes a program stored in a readable storage medium to function as a processing unit configured to execute processing in each flowchart described below.

The RAM 202 is a main memory of the CPU 201 and functions as a work area or the like.

An input controller 204 controls an operation input from a keyboard 208 or a pointing device (not illustrated) (e.g., a mouse, a touch pad, a touch panel, and a track ball).

A video controller 205 controls a display 209.

A disk controller 206 controls data access to the external memory 210 such as a hard disk (HD) or a flexible disk (FD) where various types of data are stored.

A network I/F 207 is connected to the network 102 to execute processing for controlling communication with other devices connected to the network 102.

The CPU 201, each of the controllers, and the like are mutually connected through an internal bus 211.

FIG. 2B illustrates a hardware configuration inside the MFP 101.

The MFP 101 is an example of an image forming apparatus. The CPU 221 includes a program stored in the ROM 223 (including a program for realizing each processing described below), and totally controls each of the devices via the internal bus 231. Further, the CPU 221 executes the program together with the RAM 222 and the ROM 223, and performs processing for recording image data on a recording medium such as a storage device 224.

The RAM 222 functions as a memory or a work area of the CPU 221.

A network I/F 225 transmits and receives data to and from an external network device unidirectionally or bidirectionally.

A proximity communication I/F 226 is a network I/F for proximity communication such as Near Field Communication (NFC) or Bluetooth®, and communicates with a portable terminal or the like to transmit and receive data.

A device controller 227 controls a print unit 228.

The storage device 224 functions as an external storage device.

An input/output device 230 is configured to input and output data in the MFP 101. The input/output device 230 may include a plurality of elements. Specifically, the input/output device 230 includes an operation unit configured to receive an input (such as a button input) from a user, and a transmission unit configured to transmit a signal corresponding to the input to each of the devices described above via an input/output I/F 229. In addition, the input/output device 230 further includes a display device (for example, a touch panel) configured to provide necessary information to a user or receive a user operation. Further, the input/output device 230 may include a scanning device configured to read a document to obtain electronic data as an input.

A timer 232 detects that a predetermined time is reached, generates an interrupt, and performs processing for notifying to the CPU 221. The CPU 221 can generate the interrupt by registering a schedule determined based on a program in the timer 232 to execute periodic processing.

Figure 3:
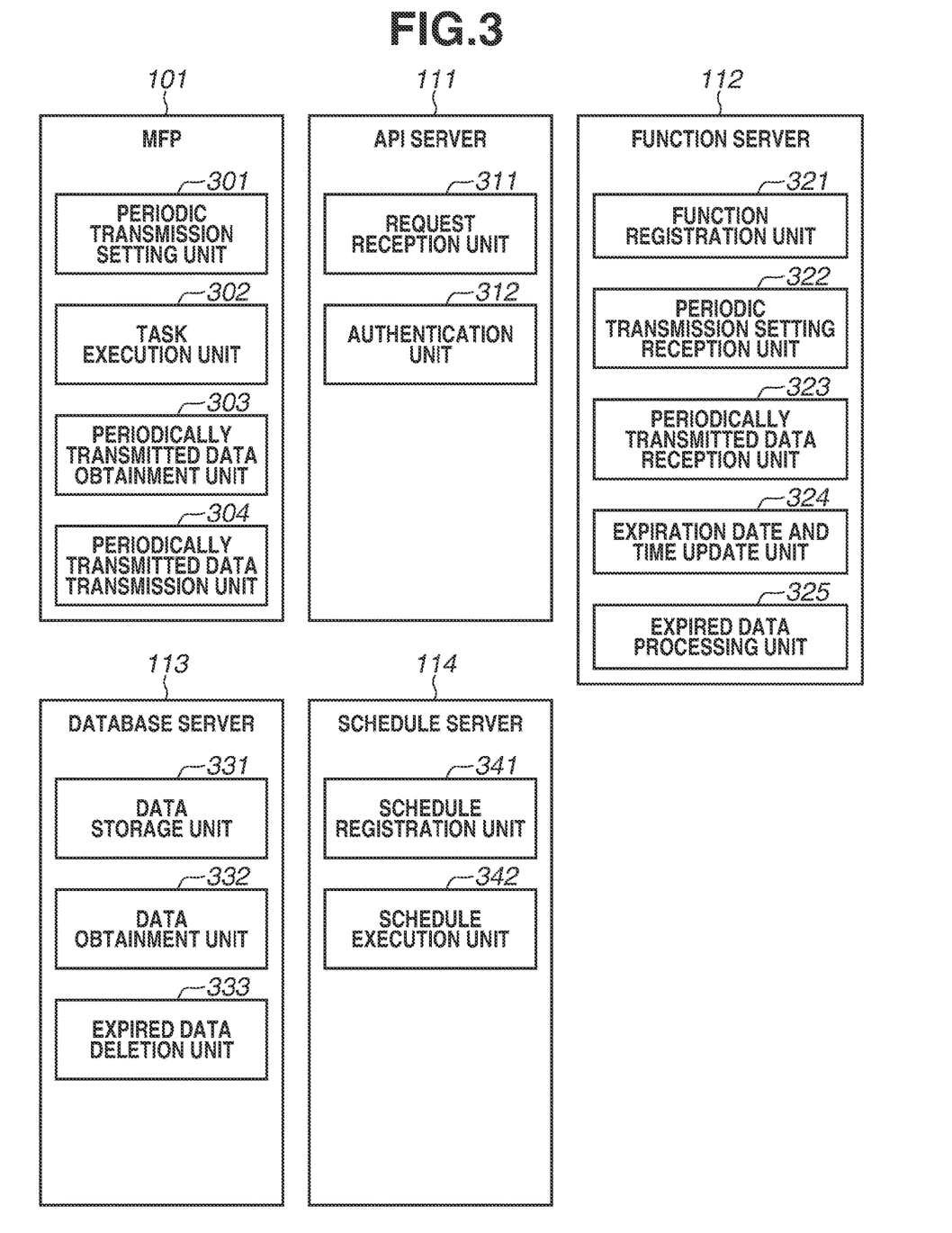
FIG. 3 illustrates an example of a configuration of software modules of each device.

FIG. 3 illustrates an example of a configuration of software modules of each of the devices to be used in the system according to the present exemplary embodiment.

In the present exemplary embodiment, each software module (each block illustrated in FIG. 3) is an example for performing the processing implemented by a program, which is executed by the CPU of each of the devices. An example is described as follows in which data periodically transmitted from the MFP 101 is generated when backup processing is performed.

First, software modules included in the MFP 101 will be described.

A periodic transmission setting unit 301 makes a setting such as a timing of transmitting various types of data periodically transmitted by the MFP 101, to the application system 110, for each request. A set value is saved in the database server 113 of the application system 110.

Here, Table 1 shows an example of periodically transmitted data set by the periodic transmission setting unit 301.

TABLE 1

Periodically transmitted data of device ID = ZZZ99999

| Data type | Periodic transmission | Execution date and time | Execution time period. | Notification destination |
|---|---|---|---|---|
| Backup | Yes | 00:00 every Tuesday | 3 hours | a@b.c |
| Counter | Yes | 30 min. past the hour | 0 | a@b.c |

In Table 1, "data type" indicates a type of periodically transmitted data. "Periodic transmission" indicates whether or not to perform processing for periodically transmitting data (periodic transmission processing).

"Execution date and time" indicates time that each periodic transmission processing is performed. For example, in the example of Table 1, the backup processing is set to be executed from 00:00 every Tuesday. Further, periodic transmission of a counter is set to be executed at 30 minutes past the hour every hour. In order to ensure that a next execution time can be seen from a current time, the execution date and time is set as an absolute value, instead of a relative value such as X hours after the previous execution time.

"Execution time period" indicates a time period required to execute each periodic transmission processing. In the example of Table 1, in the backup processing, various types of data are collected from a start of the backup and archived as a single file, and thus, a maximum of three hours is required. On the other hand, the transmission of the counter simply extracts and transmits counter data stored on the RAM 222, and thus, the execution time period is substantially zero.

"Notification destination" indicates a destination to which a notification is transmitted when each periodic transmission processing fails. The notification destination is not only an e-mail address of an administrator of the MFP 101, but may also be an HTTP endpoint for registering messages in a message notification service by Short Message Service (SMS) or various types of messaging services, for example. Further, a plurality of these destinations may be combined.

A task execution unit 302 sets the timer 232 of the MFP 101, based on the setting of the periodic transmission processing set by the periodic transmission setting unit 301, and performs control to execute each periodic transmission processing at the set time.

A periodically transmitted data obtainment unit 303 collects data from various memories and storage units of the MFP 101 based on a data type of the periodic transmission processing set by the periodic transmission setting unit 301 to create periodically transmitted data. For example, if the data type of the periodic transmission processing is backup data, the periodically transmitted data obtainment unit 303 collects necessary information from the RAM 222 or the storage device 224 of the MFP 101 and archives the collected information in a compression format such as a Zip format.

A periodically transmitted data transmission unit 304 transmits the data obtained in the periodically transmitted data obtainment unit 303 to the application system 110.

Next, software modules included in the API server 111 will be described.

A request reception unit 311 receives various types of requests which are transmitted from the MFP 101 to the application system 110. In the present exemplary embodiment, the request reception unit 311 is implemented as an HTTP endpoint using Representational State Transfer (REST) API.

Further, the request reception unit 311 analyzes a content of the request from the URI, determines a function to be called from functions in the function server 112, and calls the determined function. Further, the request reception unit 311 receives a return value of the executed function, and transmits, to the MFP 101, information on whether the request has succeeded or failed and a content about the return value.

An authentication unit 312 verifies whether the data received by the request reception unit 311 is transmitted from a legitimate MFP. Examples of the verification method include verification based on an API key, verification based on a public key encryption, verification based on a pass phrase, and the like, but any verification may be acceptable in the present exemplary embodiment.

Next, software modules included in the function server 112 will be described.

A function registration unit 321 registers a function when deploying an application, and registers a function to be called when each event occurs.

Here, Table 2 shows a specific setting of a function in the present exemplary embodiment.

TABLE 2

| Event generation source | Calling function |
|---|---|
| API (PUT schedule) | Periodic transmission setting reception unit. |
| API (PUT data) | Periodically transmitted data reception unit |
| Database Expired Schedule ID = 1234 | Expired data processing unit |
| | Expired data processing unit |

In Table 2, "event generation source" indicates a list of events that may occur in the system. A "calling function" indicates a software module to be executed by the function server 112 when each event occurs.

Based on Table 2, the function server 112 determines which function is to be called based on an event occurring in the application system 110, and executes the function determined by using the event as a trigger.

A periodic transmission setting reception unit 322 receives a periodic transmission setting transmitted by the periodic transmission setting unit 301 of the MFP 101, and saves a content of the setting into the database server 113. Further, the periodic transmission setting reception unit 322 operates an expiration date and time update unit 324 to update an expiration date and time table. A specific content on the expiration date and time table will be described below.

A periodically transmitted data reception unit 323 receives the periodically transmitted data transmitted by the periodically transmitted data transmission unit 304 of the MFP 101, and stores a content of the received data into the database server 113. Further, the periodically transmitted data reception unit 323 operates the expiration date and time update unit 324 to update the expiration date and time table.

The expiration date and time update unit 324 calculates time for receiving next periodically transmitted data from the current time and the execution date and time of the periodically transmitted data shown in Table 1, and writes the time in the expiration date and time table.

Here, Table 3 shows an example of the expiration date and time table.

TABLE 3

Expiration date and time table

| Device ID | Data type | Execution date and time | Execution time period | Notification destination | expiration date and time |
|---|---|---|---|---|---|
| ZZZ99999 | Backup | 00:00 every Tuesday | 3 hours | a@b.c | 2018 Jun. 12 3:00:00 |
| ZZZ99999 | Counter | 30 min. past the hour | 0 | a@b.c | 2018 Jun. 10 15:30:00 |
| ZZZ99999 | Backup | 00:00 Every Monday | 3 hours | a@x.y | 2018 Jun. 11 3:00:00 |

In Table 3, "device ID" indicates a unique ID for each MFP 101. The "data type", the "execution date and time", the "execution time period", and the "notification destination" are the same as the items having the same name shown in Table 1, and thus, these items will not be described here.

"Expiration date and time" is time period information corresponding to time for receiving the periodically transmitted data from a device, and indicates scheduled time when the transmission of various types of periodically transmitted data is completed. Specifically, the expiration date and time is calculated from the following equation.

expiration date and time=first execution date and time after current time+execution time period In this equation, the "first execution date and time after the current time" is time at which the next periodic transmission processing is performed, and is calculated based on the current time and the execution date and time.

As a specific example, an entity in which the device ID is ZZZ99999 and the data type is backup in Table 3 will be described. Here, assuming that the current time is 15:00 on Jun. 10, 2018 (Sun.), the closest future date and time that satisfies a condition of the execution date and time (00:00 every Tuesday) is 00:00 on Jun. 12, 2018 (Tue.). Therefore, 03:00 on Jun. 12, 2018 (Tue.), which is obtained by adding the execution time period, that is, three hours, to this date and time, is set as the expiration date and time.

An expired data processing unit 325 is driven by an event of deleting an entity from the database server 113, and performs processing for transmitting the notification to the set notification destination. Further, similarly to the expiration date and time update unit 324, the expired data processing unit 325 writes the entity with the updated expiration date and time into the expiration date and time table again. This processing will be described in detail with reference to flowcharts described below.

Next, software modules included in the schedule server 114 will be described.

A schedule registration unit 341 receives a setting value of the application system 110, and generates a task for activating a schedule.

A schedule execution unit 342 generates an event for the function server 112, based on the setting value received by the schedule registration unit 341.

Finally, software modules included in the database server 113 will be described.

A data storage unit 331 stores data which various types of functions in the function server 112 request to store, in a nonvolatile memory or a hard disk after assigning an index to the data to improve searchability.

A data obtainment unit 332 extracts the data requested by the various types of functions in the function server 112 from the nonvolatile memory or the hard disk and provides the data.

An expired data deletion unit 333 deletes an entity whose date and time set as the "expiration date and time" of the expiration date and time table has elapsed. Further, the expired data deletion unit 333 transmits the lapse of the expiration date and time, as an event, to the function server 112.

Here, Table 4 shows an example of an event occurring when an expiration date and time has elapsed and the data is deleted.

TABLE 4

| Deletion time | Table name | Deleted data |
|---|---|---|
| 2018 Jun. 12 3:00:00.012 | Expiration date and time table | Device ID: ZZZ99999, |

TABLE 4-continued

| Deletion time | Table name | Deleted data |
|---|---|---|
| | | Data type: Backup, . . . |

"Deletion time" indicates time that the expired data deletion unit 333 deletes the entity whose expiration date and time has elapsed. "Table name" indicates a table of the entity deleted by the expired data deletion unit 333. "Deleted data" indicates data actually deleted.

In the system, an automatic data deletion mechanism to be executed in the expired data deletion unit 333 can be deactivated based on a setting of the application.

Figure 4:
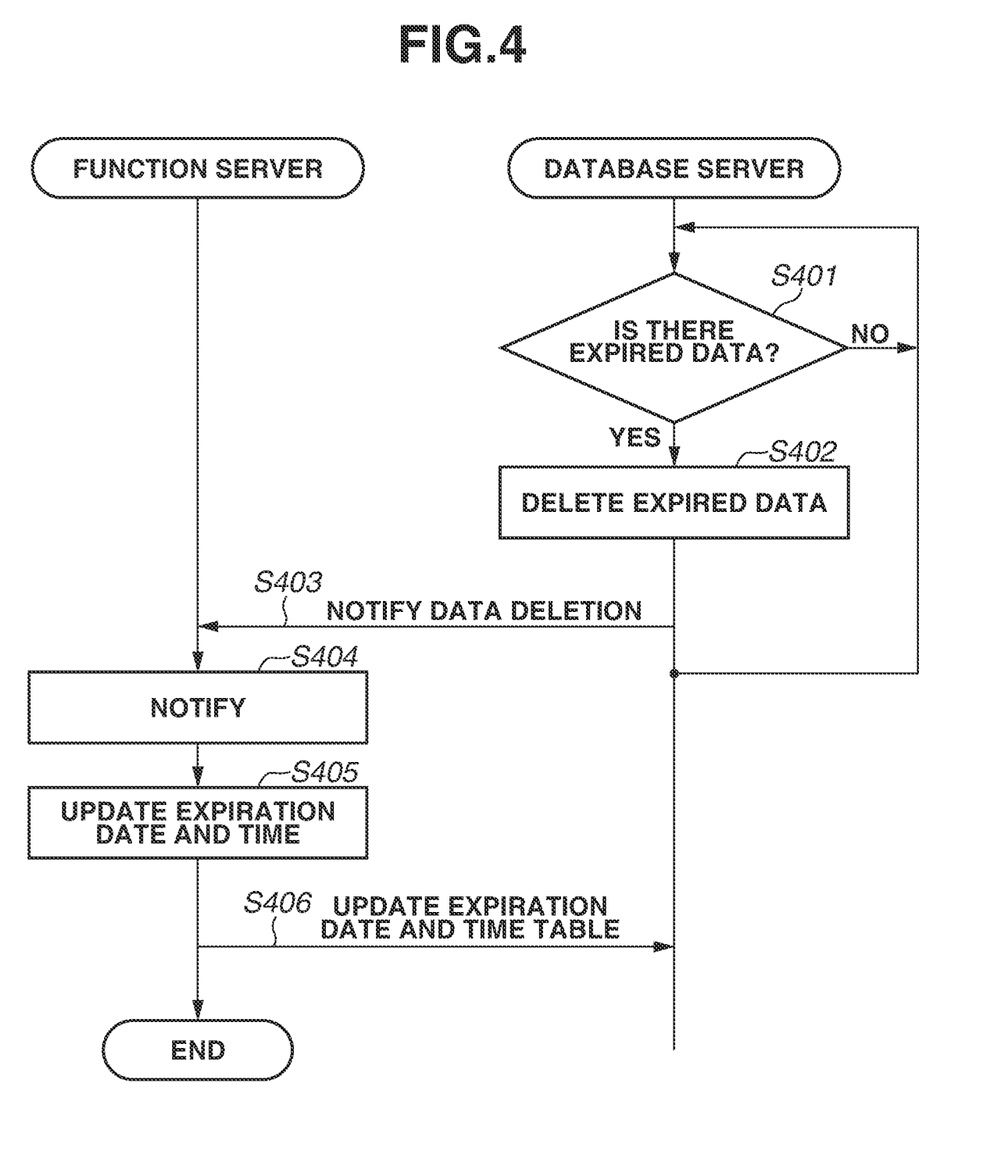
FIG. 4 is a flowchart illustrating processing for deleting expired data (first exemplary embodiment).

Next, with reference to FIG. 4, a flow of processing performed when data is deleted due to a lapse of an expiration date and time and a notification is executed will be described. FIG. 4 is a flowchart illustrating a processing procedure of expired data in the first exemplary embodiment.

In step S401, the expired data deletion unit 333 of the database server 113 first checks whether there is expired data. The expired data is an entity in which a set expiration date and time is earlier than the current time.

If there is the expired data (Yes in step S401), in step S402, the expired data deletion unit 333 deletes the relevant entity.

Then, in step S403, the expired data deletion unit 333 notifies, as an event, the function server 112 of the deletion of the expired data.

Thereafter, the operation returns to step S401 to repeat the processing. Further, in a case where there is no expired data in step S401 (No in step S401), the operation returns to step S401 to repeat the processing.

Upon reception of an event from the database server 113 in step S403, in step S404, the expired data processing unit 325 of the function server 112 extracts the registered notification destination from the expired data of the received event and executes various types of notifications. As described above, the notification destination may also include, in addition to an e-mail address of an administrator of the MFP 101, for example, an HTTP endpoint for registering messages in the message notification service by SMS or various types of messaging services. Further, a plurality of these destinations may be combined.

Next, in step S405, the expired data processing unit 325 recalculates the expiration date and time, and updates the expiration date and time. Then, in step S406, the expired data processing unit 325 creates an entity with the updated expiration date and time, and updates the expiration date and time table of the database server 113.

When the processing of step S406 is ended, the function server 112 determines that the processing of the expired data processing unit 325 is ended, deletes a resource owned by the executed function, and ends the executed function.

As described above, in the first exemplary embodiment, the function is executed using, as a trigger, the deletion of the data whose expiration date and time has elapsed, the notification is successively sent to a single MFP by using a single function. Therefore, even if the number of MFPs 101 connected to the application system 110 increases, the execution time period of the function does not depend on the number of MFPs, so that the system can be operated without causing a time-out.

Also, in the method of periodically checking the state of all clients as discussed in Japanese Patent Application Laid-Open No. 2008-77324, it is necessary to execute a huge amount of search processing on the database server based on the number of clients at the timing of checking. For this reason, access to the database server is concentrated at the timing of checking the state of the clients.

On the other hand, in the present exemplary embodiment, the notification processing is successively performed by executing the function for each event, and thus, even if the number of MFPs increases, the concentrated access to the database is not generated as long as the notifications are not intensively concentrated in a certain time period. This makes it possible to reduce a peak load on the database server because the access to the database server is uniform.

A second exemplary embodiment will be described below. In the first exemplary embodiment, the method of making a notification using the functionality of automatically deleting the expired data from the database is described. However, in the second exemplary embodiment, a method of periodically detecting the expired data by using the timer 232 provided with the schedule server 114 for making a notification will be described. The same reference numerals are used in the description where the same processing as the first exemplary embodiment is performed, and the description is omitted.

Figure 5:
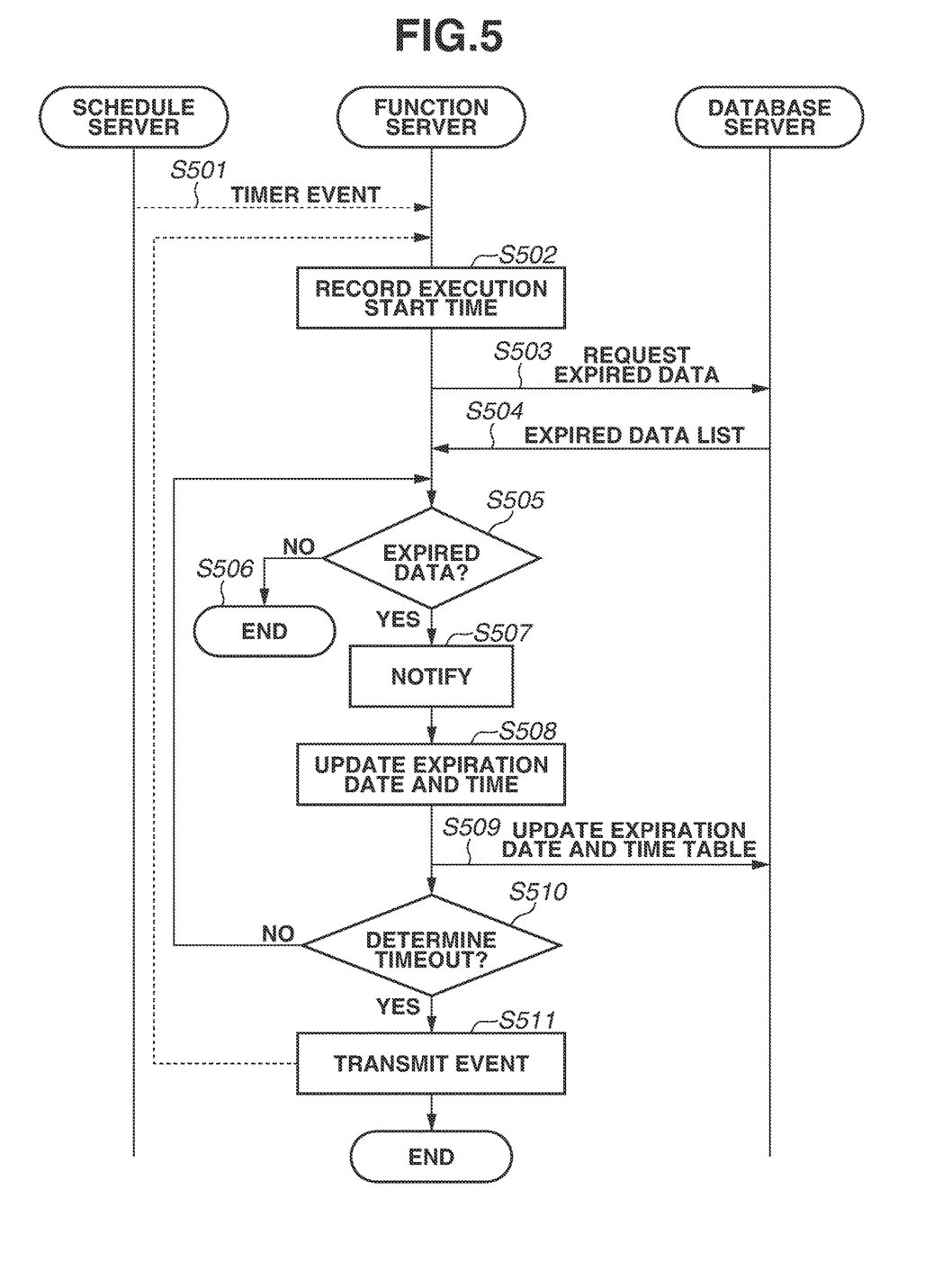
FIG. 5 is a flowchart illustrating processing for deleting expired data (second exemplary embodiment).

FIG. 5 is a flowchart illustrating a processing procedure of the expired data in the second exemplary embodiment. In the second exemplary embodiment, the automatic deleting mechanism of expired date in the database server 113 is not used, and thus, the expired data deletion unit 333 is deactivated in advance.

In step S501, first, the schedule server 114 uses the functionality of the timer 232 to detect that the expiration date and time set in the expiration date and time table is reached, and notifies the function server 112 of the event.

Here, Table 5 shows an example of an event generated by the schedule server 114.

TABLE 5

| Execution start time | Timer ID |
|---|---|
| 2018 Jun. 12 3:00:00.012 | TM1 |

"Execution start time" indicates an exact time when the timer is started. "Timer ID" is a unique ID for distinguishing a timer which generates an event.

In step S502, upon receiving notification of the event, the expired data processing unit 325 of the function server 112 records the current time as the execution start time for a subsequent time-out determination.

Next, in step S503, the expired data processing unit 325 requests the data obtainment unit 332 of the database server 113 to provide a list of expired data, that is, entities whose expiration date and time is earlier than the current time.

Upon reception of the request in step S503, in step S504, the data obtainment unit 332 searches for the data from a hard disk and a nonvolatile memory in the data obtainment unit 332, and transmits a list of the expired data, as the search result, to the expired data processing unit 325 as a return value.

In step S505, the expired data processing unit 325 detects whether there is unprocessed expired data from the return value received from the data obtainment unit 332 in step S504.

If there is no unprocessed expired data (No in step S505), in step S506, the expired data processing unit 325 determines that the notification is completed for all the expired data, and the flowchart ends.

On the other hand, if there is unprocessed expired data (Yes in step S505), in step S507, the expired data processing unit 325 extracts one piece of the data from the unprocessed expired data and performs the notification processing for the data. The notification processing in step S507 is the same as the processing in step S404 described in the first exemplary embodiment.

Then, in step S508, the expired data processing unit 325 updates the expiration date and time of the extracted unprocessed expired data, and, in step S509, writes the updated entity into the database server 113.

It is noted that the processing of step S508 and step S509 is also similar to the processing of step S405 and step S406 described in the first exemplary embodiment, respectively.

Thereafter, in step S510, the expired data processing unit 325 determines whether there is a remaining time period until the expired data processing unit 325 is timed out. The determination is performed by comparing a difference between the execution start time obtained in step S502 and the current time obtained in step S510, with a time-out period recorded in advance on the function server 112.

If the timeout is not yet reached (No in step S510), the processing returns to step S505 where the expired data processing unit 325 continues the notification processing for the remaining unprocessed expired data.

If the timeout is reached (Yes in step S510), in step S511, the expired data processing unit 325 issues an event again to activate the function of the expired data processing unit 325.

Finally, if the processing of the expired data processing unit 325 is ended, the function server 112 deletes a resource owned by the executed function.

Here, Table 6 shows an example of a format of the event issued in step S511.

TABLE 6

| Execution start time | Event ID |
| --- | --- |
| 2018 Jun. 12 3:00:00.012 | EV1 |

In Table 6, "execution start time" indicates an exact time when the timer 232 is started. "Event ID" is a unique ID for distinguishing various types of events.

After completing the issue of the event in step S511, the flowchart ends.

Even if all the expired data cannot be processed due to the timeout, the flowchart is executed recursively as a result of another operation of the expired data processing unit 325, which is triggered by the event issued in step S511. As a result, the processing is continuously performed, so that the notification processing can be performed for all the expired data regardless of the automatic deletion mechanism of the function server 112.

Here, Table 7 shows a list of functions registered in the function registration unit 321 according to the second exemplary embodiment.

TABLE 7

| Event generation source | Calling function |
| --- | --- |
| API (PUT schedule) | Periodic transmission setting reception unit |
| API (PUT data) | Periodically transmitted data reception unit |
| Timer ID = TM1 | Expired data processing unit |
| Event ID = EV1 | Expired data processing unit |

Also in the second exemplary embodiment, as in the first exemplary embodiment, an event generated in the API server 111 is set to be processed by the corresponding software module. The timer with the ID "TM1" and the event with the ID "EV1" are both set to be processed by the expired data processing unit 325. That is, the same function is executed out of a plurality of different events.

As described above, in the second exemplary embodiment, even in the periodic processing using a timer, the notification processing with respect to all the devices can be performed by generating and issuing an event for processing the expired data processing unit 325 itself before the timeout.

A third exemplary embodiment will be described below. In the third exemplary embodiment, an example will be described in which notifications with respect to a plurality of devices are aggregated and executed for each notification destination by constructing the method of the first exemplary embodiment in many stages.

In the methods of the first exemplary embodiment and the second exemplary embodiment, even if the same notifications with respect to a plurality of devices are generated at substantially the same time, the number of transmissions corresponding to the number of notifications to be generated are performed. However, in a case of a customer having a large number of devices (MFPs), if emails with respect to the number of devices are transmitted at substantially the same time, it is highly likely that a network environment of the customer may be overloaded. Therefore, in the present exemplary embodiment, the notifications generated at substantially the same time are aggregated and transmitted for each notification destination or the like rather than for each device.

Figure 6:
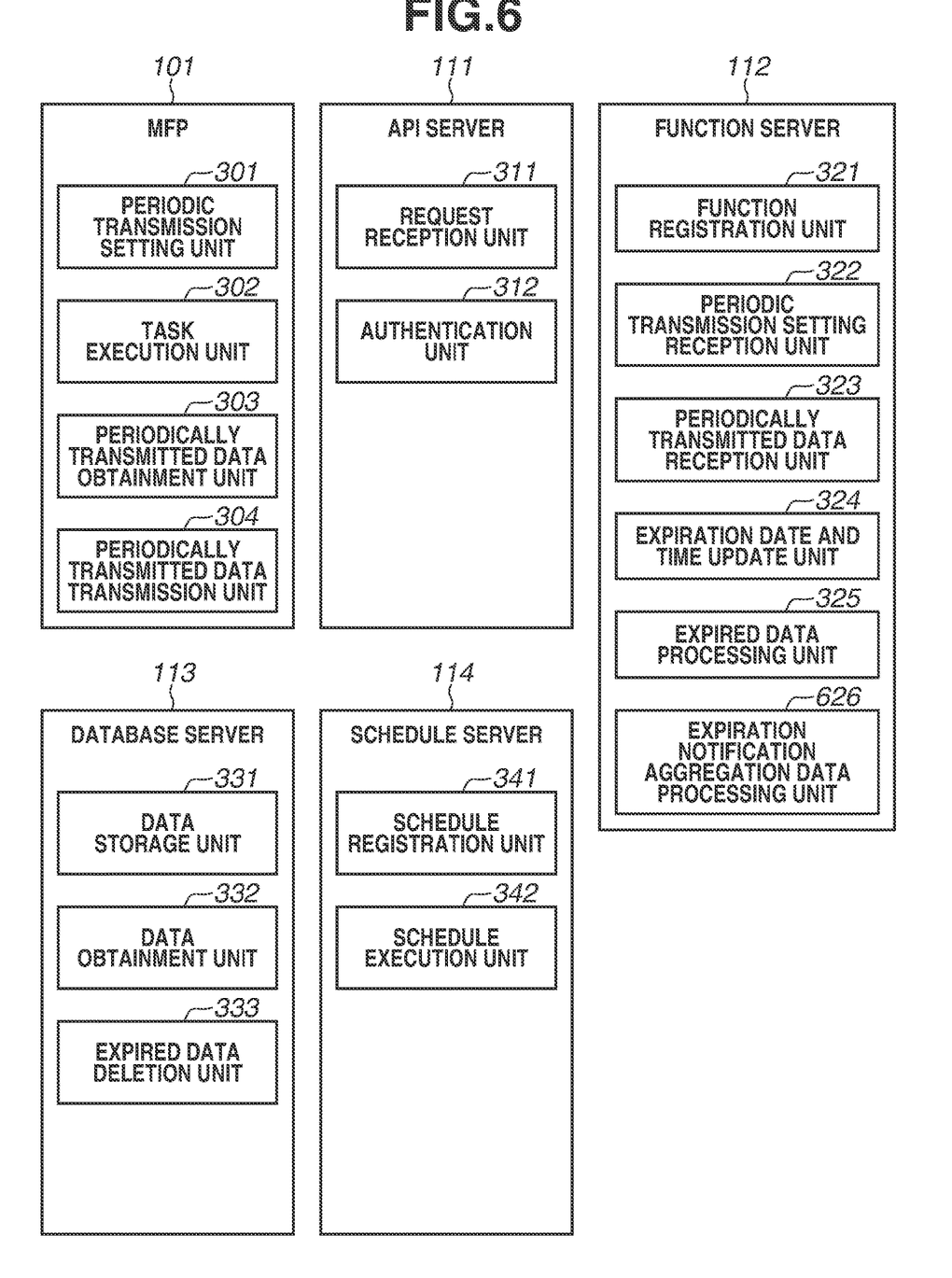
FIG. 6 illustrates an example of a configuration of software modules of each device (third exemplary embodiment).

FIG. 6 illustrates an example of a configuration of software modules of each device used in the third exemplary embodiment. The same reference numerals are used for software modules configured to perform similar operations as those in FIG. 3, and the descriptions thereof will be omitted.

The function server 112 includes an expiration notification aggregation data processing unit 626 in addition to the software modules described in FIG. 3. The expiration notification aggregation data processing unit 626 is a software module to be executed for a notification aggregation table described below at a time of automatic deletion due to expiration, and is a function of actually performing notification processing. The expiration notification aggregation data processing unit 626 will be described in detail below.

Figure 7:
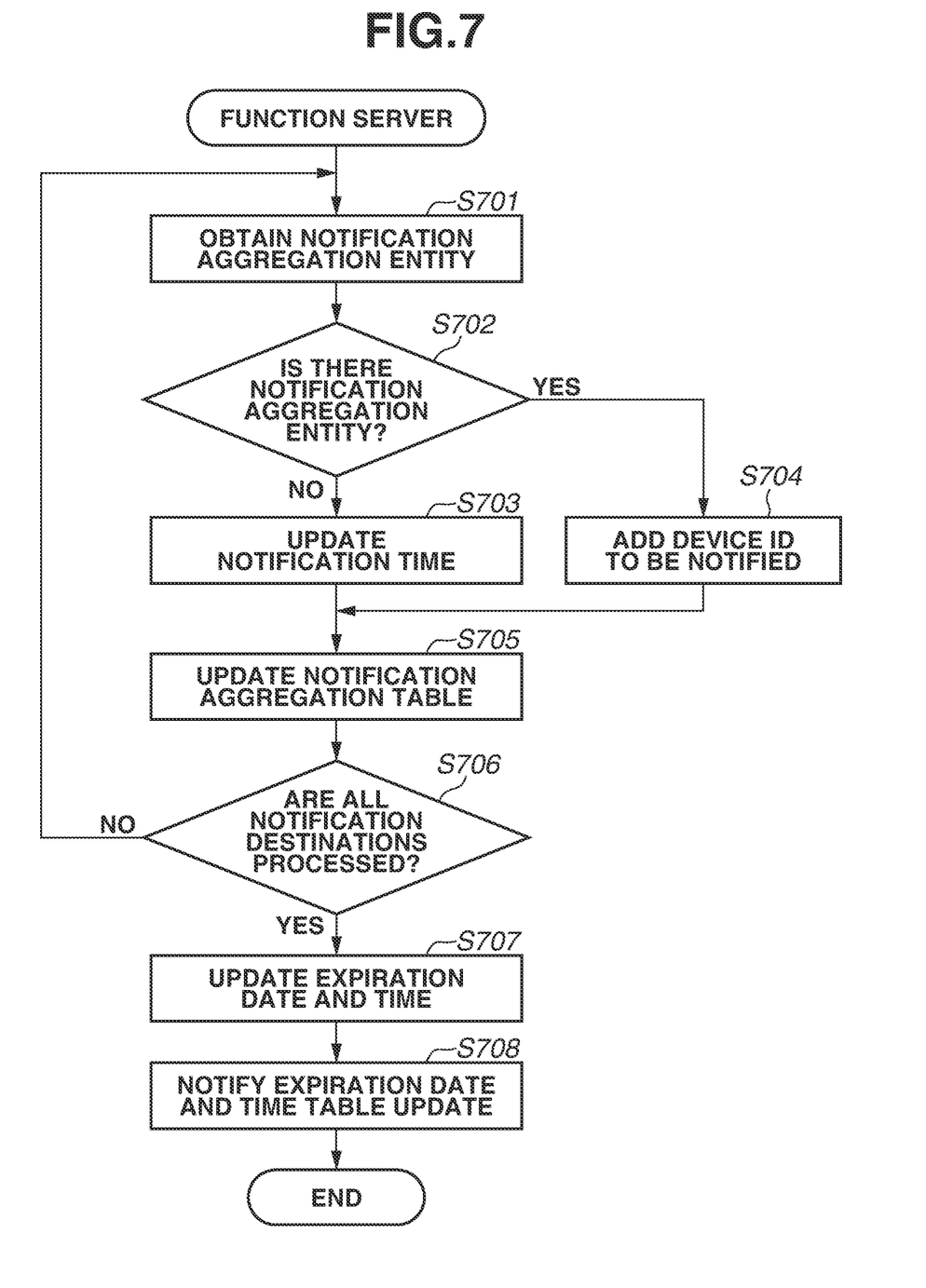
FIG. 7 is a flowchart illustrating processing for deleting expired data (third exemplary embodiment).

FIG. 7 is a flowchart illustrating a processing procedure of expired data in the third exemplary embodiment. The flowchart is started by using, as a trigger, an event of deleting an entity from the above-described expiration date and time table.

If the flowchart is activated, in step S701, the expired data processing unit 325 of the function server 112 obtains a notification aggregation entity from the notification aggregation table of the database server 113. The "notification aggregation entity" means an entity whose notification destination and data type are the same.

Here, Table 8 shows an example of the notification aggregation table.

TABLE 8

| Notification destination | Data type | Device ID | Expiration date and time |
|---|---|---|---|
| a@b.c | Backup | ZZZ99999, ZZZ99997 | 2018 Jun. 12 3:00:00 |
| a@b.c | Counter | ZZZ99999 | 2018 Jun. 10 14:30:00 |
| a@x.y | Backup | ZZZ99998 | 2018 Jun. 11 3:00:00 |

In Table 8, "notification destination" is the same as the notification destination in Table 1, and thus, the description will be omitted. "Data type" is a type of periodically transmitted data. "Device ID" indicates a device determined as not yet having received periodically transmitted data. "Expiration date and time" indicates time when data is deleted by the expired data deletion unit 333.

In the example of Table 8, as described below, the notifications are simultaneously transmitted to the notification destination for a plurality of devices (whose device IDs are ZZZ99999, ZZZ99997, respectively) managed by the same administrator (whose notification destination is a@b.c).

If there is no notification aggregation entity (No in step S702), in step S703, an expiration date and time is set to create a new entity. A value substituted for the expiration date and time is a value obtained by adding an aggregation period to the current time. The aggregation period is a constant period previously determined to aggregate and transmit entities having the same notification destination and data type.

If there is a notification aggregation entity (Yes in step S702), in step S704, the device ID of a device to be notified is added to a field of the device ID of the corresponding entity.

Thereafter, in step S705, the expired data processing unit 325 saves a changed or newly created notification aggregation entity, and updates the notification aggregation table.

Thus, when the notification aggregation table is updated, the same type of events generated within the aggregation period after the event to be notified first, can be aggregated and notified to the same notification destination.

Here, a plurality of notification destinations described in the expiration date and time table can be set as a layout format. Therefore, in step S706, the processing from step S701 to step S705 is repeated until the processing is executed on all the notification destinations.

If the processing on all the notification destinations is completed (Yes in step S706), in step S707, the expired data processing unit 325 updates the expiration date and time.

Then, in step S708, the expired data processing unit 325 transmits the updated expiration date and time table to the database server 113.

The processing of step S707 and step S708 are the same as the processing of step S405 and step S406 in the first exemplary embodiment, respectively.

Finally, when the processing of the expired data processing unit 325 is completed, the function server 112 deletes a resource owned by the executed function.

Figure 8:
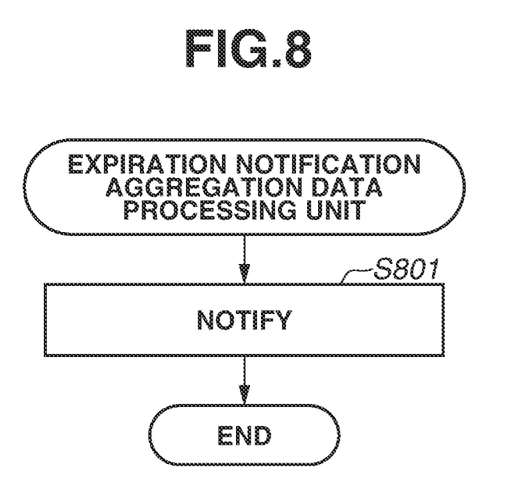
FIG. 8 is a flowchart illustrating processing for aggregating and notifying data.

FIG. 8 is a flowchart illustrating an operation flow in the expiration notification aggregation data processing unit 626.

The flowchart is started by using, as a trigger, an event in which the expired data deletion unit 333 deletes the expired data from the notification aggregation table.

Here, Table 9 shows an example of an event when the expired data is deleted from the notification aggregation table.

TABLE 9

| Deletion time | Table name | Deleted data |
|---|---|---|
| 2018 Jun. 12 3:00:00.012 | Notification aggregation table | Notification destination; a@b.c, Data type: Backup, . . . |

The "deletion time", the "table name", and the "deleted data" in Table 9 are the same as those in Table 4 and thus the description thereof is omitted.

An entity deleted from the notification aggregation table, which is a trigger for starting the flowchart, is substituted into the deleted data.

In step S801, the expiration notification aggregation data processing unit 626 extracts the notification destination included in the deleted data of the deleted entity and transmits the notification to the notification destination. The notification destination and the notification method will not be described because these are the same as those in the first and second exemplary embodiments. However, since the notifications with respect to a plurality of devices are sent to the same notification destination at the same time, for example, as explanation is provided to facilitate the understanding of a situation as follows.

"The backup processing has not been executed in the following devices managed by you. Please check the settings.

ZZZ99999
ZZZ99997"

In the third exemplary embodiment, unlike the processing in the expired data processing unit 325 according to the first or second exemplary embodiment, a content managed on the notification aggregation table does not have periodic processing, and thus, processing for updating the content of the entity is not required. Therefore, the function ends as soon as the notification is ended.

Finally, when the function server 112 determines that the processing of the expiration notification aggregation data processing unit 626 is ended, the function server 112 deletes a resource owned by the executed function.

As described above, in the third exemplary embodiment, the deletions due to the lapse of the expiration date and time of the database generated within the aggregation period are aggregated and notified. As a result, the notifications with respect to a plurality of devices managed by the same administrator can be collectively executed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-174454, filed Sep. 19, 2018, which is hereby incorporated by reference herein in its entirety.

What is claimed is:

1. A management system for receiving data from a plurality of network devices to manage the received data, comprising:
   one or more processors; and
   at least one memory storing instructions, which when executed by the one or more processors, cause the management system to:
   write, as an expiration date and time, into a database, time period information corresponding to time of receiving data from each of the network devices, for each of the network devices;
   execute a notification with respect to a network device corresponding to the expiration date and time, according to a first function to be executed in response to an event based on a lapse of the expiration date and time in the database; and
   subsequently write, according to the first function, as the expiration date and time for the network device for which the notification is executed, into the database, time period information corresponding to next time for receiving data from the network device,
   wherein the first function is ended after the expiration date and time is written.

2. The management system according to claim 1, wherein the instructions, when executed by the one or more processors, further cause the management system to:
   update, in the database, the expiration date and time for the network device with time period information corresponding to the next time for receiving data from the network device, according to a second function to be executed in response to reception of the data from any one of the plurality of network devices.

3. The management system according to claim 1, wherein in the database, in response to a lapse of the expiration date and time, data including the expiration date and time for the network device corresponding to the expiration date and time is deleted, and the event is issued in response to the deletion of the data.

4. The management system according to claim 1, wherein the notifications with respect to a plurality of network devices corresponding to the expiration date and time having elapsed within a certain period are aggregated and executed.

5. The management system according to claim 1, wherein the network device is an image processing apparatus.

6. The management system according to claim 1, wherein the management system manages data for backup of the network device as data from the network device.

7. A management method in a management system for receiving data from a plurality of network devices to manage the received data, the method comprising:
   writing, as an expiration date and time, into a database, time period information corresponding to time of receiving data from each of the network devices, for each of the network devices;
   executing a notification with respect to a network device corresponding to the expiration date and time, according to a first function to be executed in response to an event based on a lapse of the expiration date and time in the database; and
   subsequently writing, according to the first function, as the expiration date and time for the network device for which the notification is executed, into the database, time period information corresponding to next time for receiving data from the network device,
   wherein the first function is ended after the expiration date and time is written.

* * * * *